(12) United States Patent
Breau

(10) Patent No.: US 8,210,762 B1
(45) Date of Patent: Jul. 3, 2012

(54) VEHICLE WINDOW CLEANING SYSTEM

(76) Inventor: Paul R. Breau, Pikering (CA)

( * ) Notice: Subject to any disclaimer, the term of this patent is extended or adjusted under 35 U.S.C. 154(b) by 576 days.

(21) Appl. No.: 12/424,699

(22) Filed: Apr. 16, 2009

(51) Int. Cl.
*A46B 11/00* (2006.01)
*A45D 33/00* (2006.01)

(52) U.S. Cl. .......................... 401/126; 15/245; 401/130

(58) Field of Classification Search .............. 401/23–25, 401/99, 115, 125, 126, 130, 131, 139, 191, 401/197; 15/209.1, 220.1, 225, 244.1, 245; 206/225, 229
See application file for complete search history.

(56) References Cited

U.S. PATENT DOCUMENTS

| | | | | |
|---|---|---|---|---|
| 3,837,747 A | | 9/1974 | Seymore | |
| 3,938,686 A | * | 2/1976 | Milligan et al. | 215/232 |
| 4,776,716 A | * | 10/1988 | Huang | 401/139 |
| D355,061 S | | 1/1995 | Stokes | |
| 6,036,388 A | * | 3/2000 | Atcher | 401/118 |
| 6,135,276 A | * | 10/2000 | French et al. | 206/225 |
| 6,758,331 B2 | * | 7/2004 | DeHart | 206/229 |
| 6,854,910 B2 | * | 2/2005 | Leblanc | 401/118 |
| 7,311,458 B2 | * | 12/2007 | Verlin | 401/130 |
| 7,350,998 B2 | * | 4/2008 | Walsh, III | 401/131 |
| 2002/0078521 A1 | | 6/2002 | Ohm | |
| 2006/0029458 A1 | * | 2/2006 | Jones | 401/129 |

* cited by examiner

*Primary Examiner* — David J. Walczak
*Assistant Examiner* — Jennifer C Chiang

(57) ABSTRACT

A vehicle window cleaning system includes a housing that has an end wall and a perimeter wall that is attached to and extends away from the end wall. The perimeter wall has a distal edge with respect to the end wall defining an opening extending into the housing. A squeegee assembly is removably positionable within the housing. Cleaning fluid is positionable within the housing and accessible by the squeegee assembly.

5 Claims, 5 Drawing Sheets

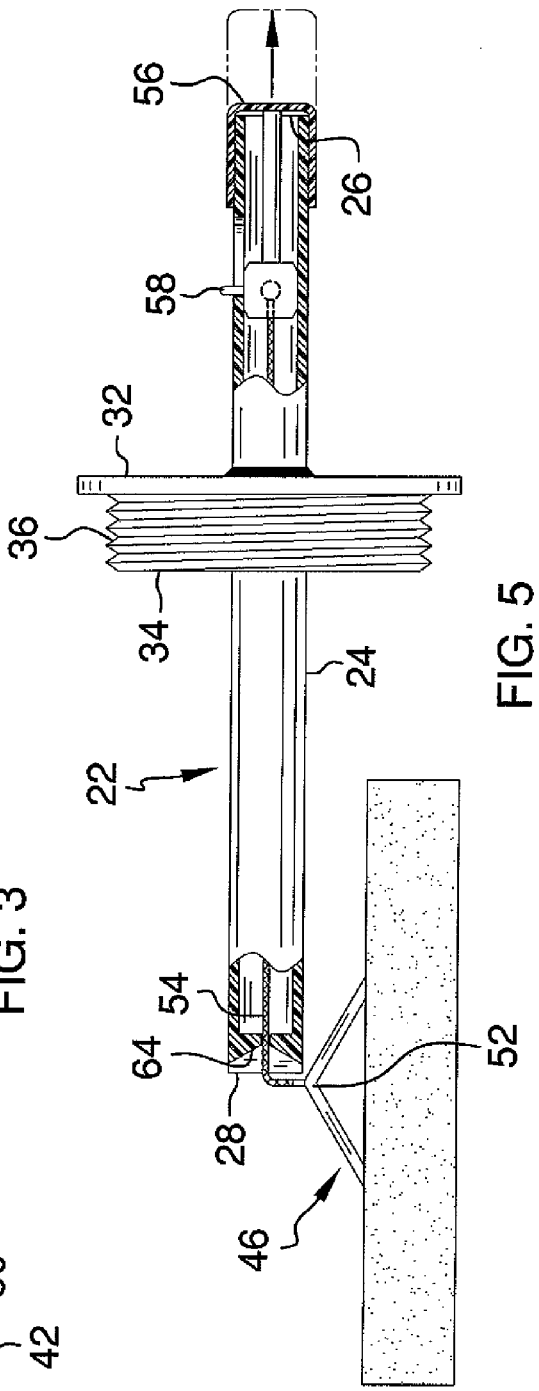
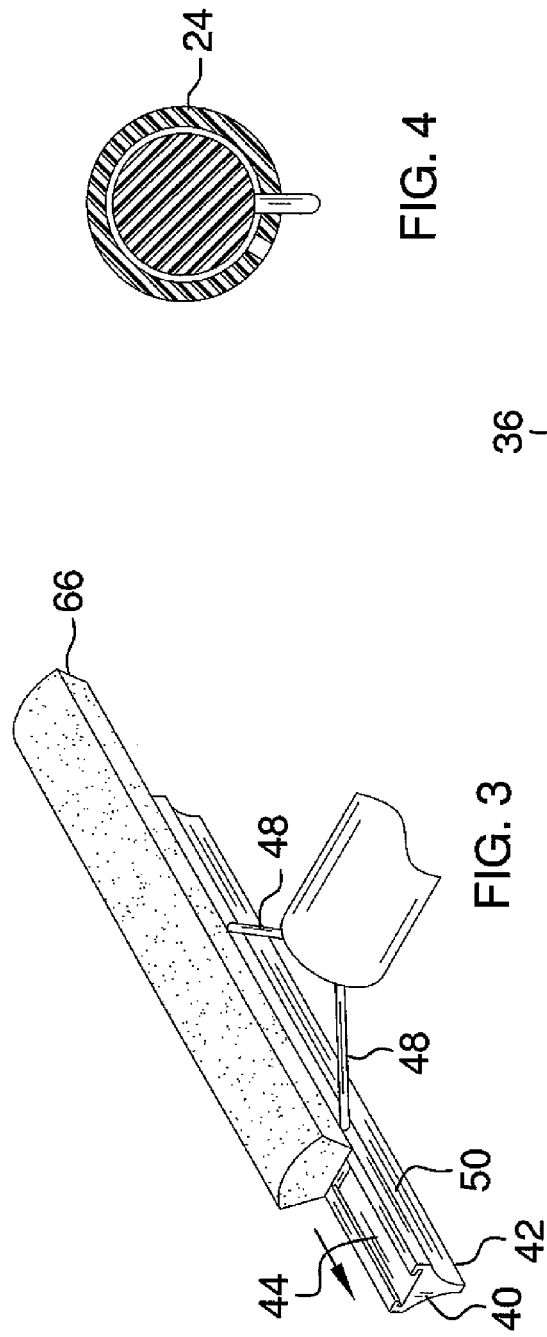
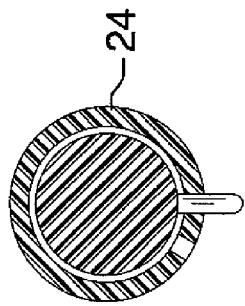
FIG. 3
FIG. 4
FIG. 5

VEHICLE WINDOW CLEANING SYSTEM

BACKGROUND OF THE DISCLOSURE

Field of the Disclosure

The disclosure relates to vehicle window cleaning devices and more particularly pertains to a new vehicle window cleaning device for assisting a person in cleaning their vehicle windows in a manner that allows them to have cleaning implements required for such a task within their vehicle.

SUMMARY OF THE DISCLOSURE

An embodiment of the disclosure meets the needs presented above by generally comprising a housing that has an end wall and a perimeter wall that is attached to and extends away from the end wall. The perimeter wall has a distal edge with respect to the end wall defining an opening extending into the housing. A squeegee assembly is removably positionable within the housing. Cleaning fluid is positionable within the housing and accessible by the squeegee assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a broken top perspective view of a squeegee an embodiment of the disclosure.

FIG. 4 is a cross-sectional view taken along line 4-4 of FIG. 1 of an embodiment of the disclosure.

FIG. 5 is a side broken view of the squeegee an embodiment of the disclosure.

DESCRIPTION OF THE PREFERRED EMBODIMENT

Figure 1:
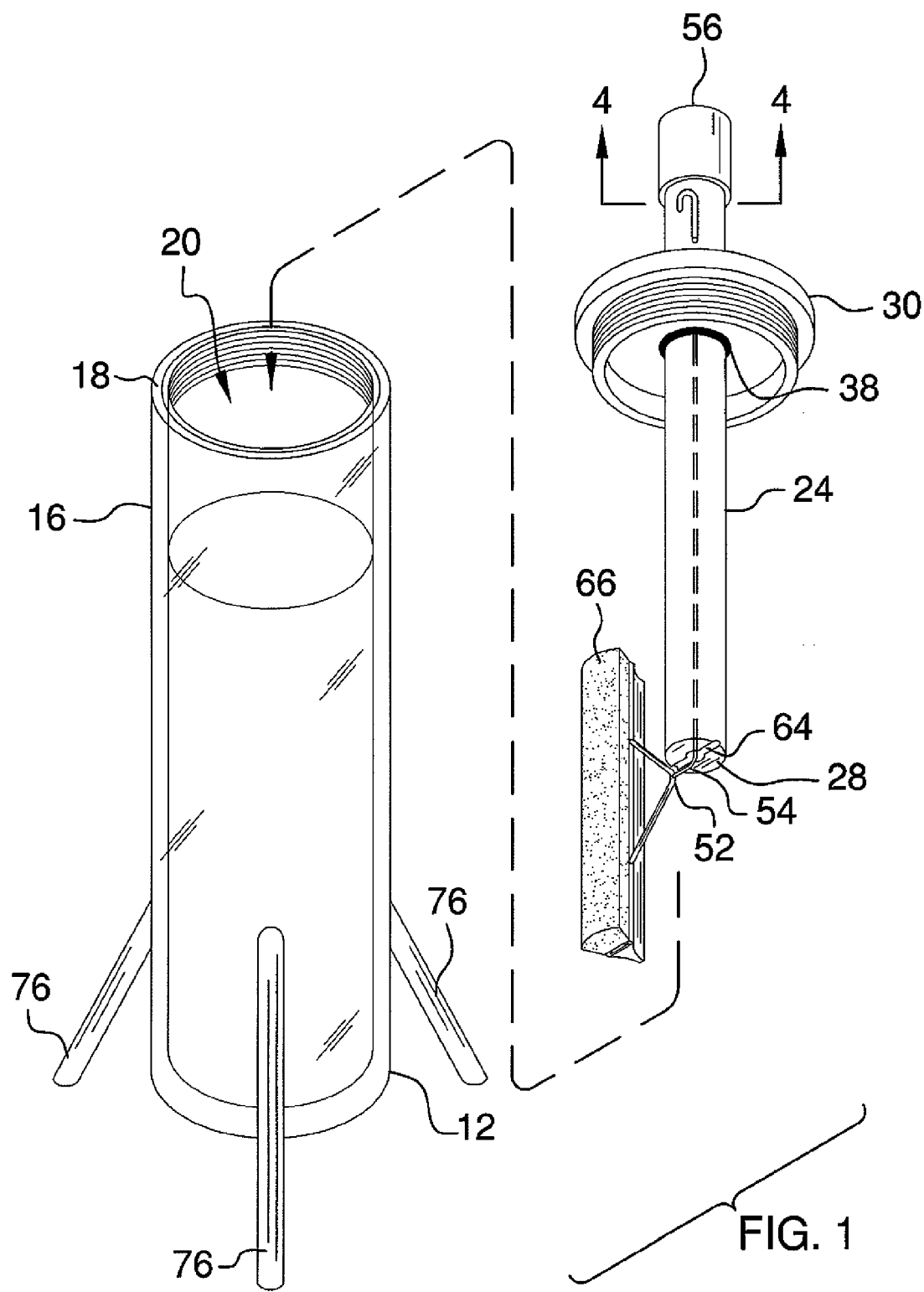
FIG. 1 is an expanded front perspective view of a vehicle window cleaning system according to an embodiment of the disclosure.

With reference now to the drawings, and in particular to FIGS. 1 through 7 thereof, a new vehicle window cleaning device embodying the principles and concepts of an embodiment of the disclosure and generally designated by the reference numeral 10 will be described.

As best illustrated in FIGS. 1 through 7, the vehicle window cleaning system 10 generally comprises a housing 12 that has an end wall 14 and a perimeter wall 16 that is attached to and extends away from the end wall 14. The perimeter wall 16 has a distal edge 18 with respect to the end wall 14 defining an opening 20 extending into the housing 12. The perimeter wall 16 is translucent to allow viewing of material within the housing 12. The amount of translucence may be slight to nearly completely transparent to just ensure that a person may see if fluids are in the housing 12.

A squeegee assembly 22 is removably positionable within the housing 12. The squeegee assembly 22 includes an elongated handle 24 that has a first end 26 and a second end 28. A cap 30 has a first side 32, a second side 34 and a perimeter edge 36 extending between the first 32 and second 34 sides. The handle 24 extends through the first 32 and second 34 sides and the cap 30 is attached to the handle 24 between the first 32 and second 34 ends. A seal 38 prevents fluid from leaking outwardly of the cap 30 through a juncture of the cap 30 and handle 24. It should be understood, however, that the handle 24 may be integral with the cap 30. The perimeter edge 36 is engageable with the peripheral wall 16 to close the opening 18 while the second end 28 is positioned within the housing 12. The cap 30 may be threadably coupled to the perimeter wall 16.

Figure 2:
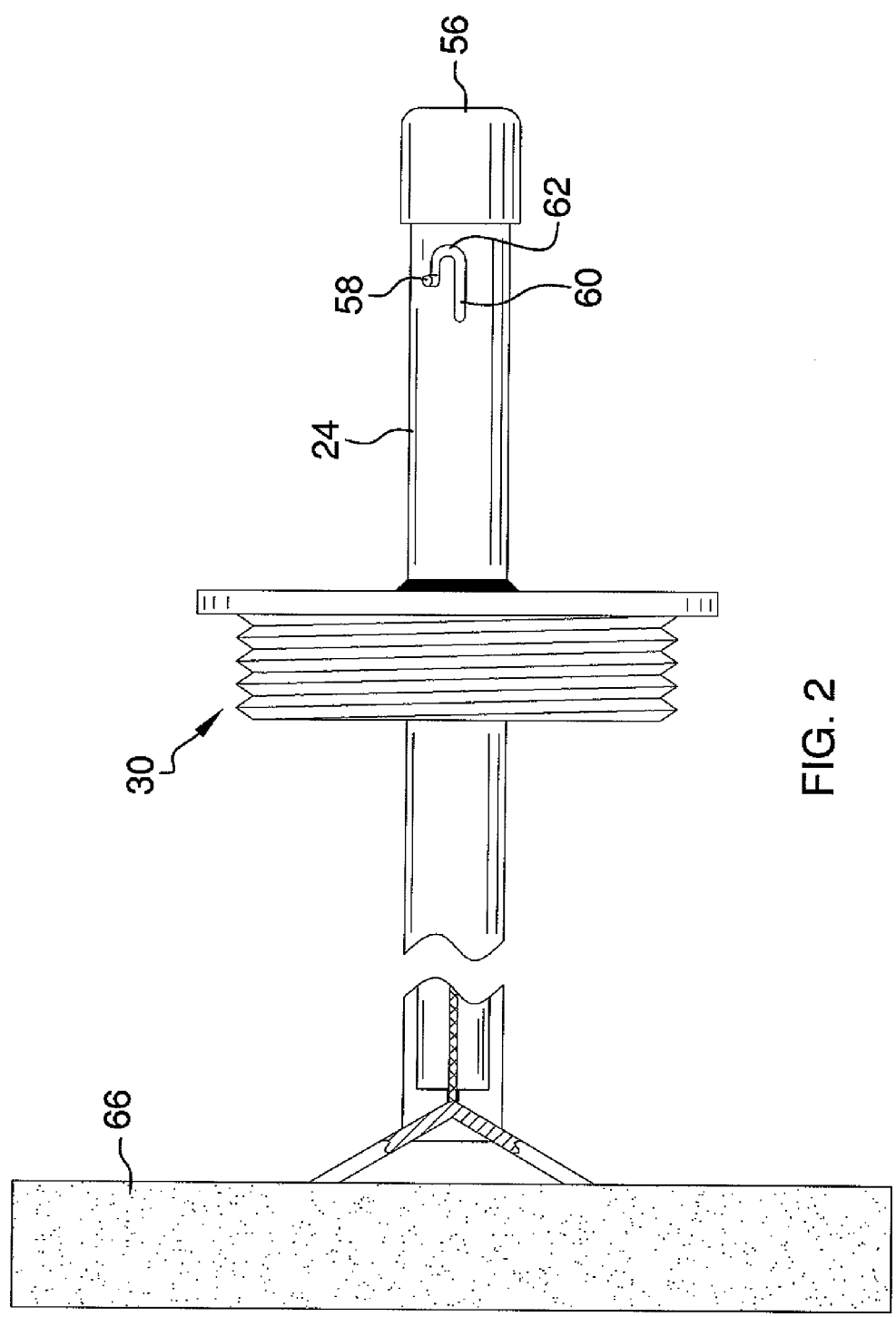
FIG. 2 is a broken side view of an embodiment of the disclosure.
Figure 6:
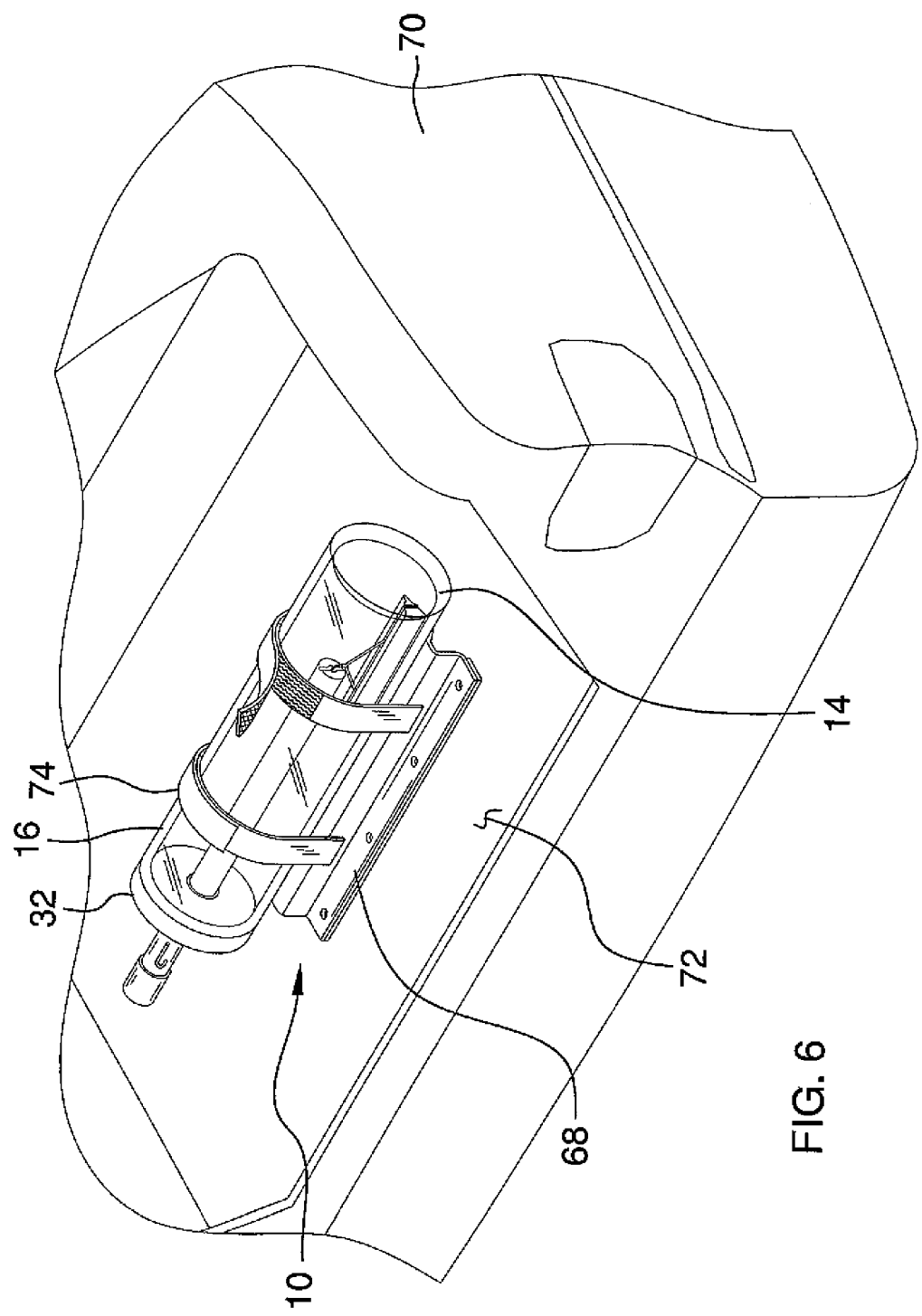
FIG. 6 is a top perspective view of an embodiment of the disclosure.
Figure 7:
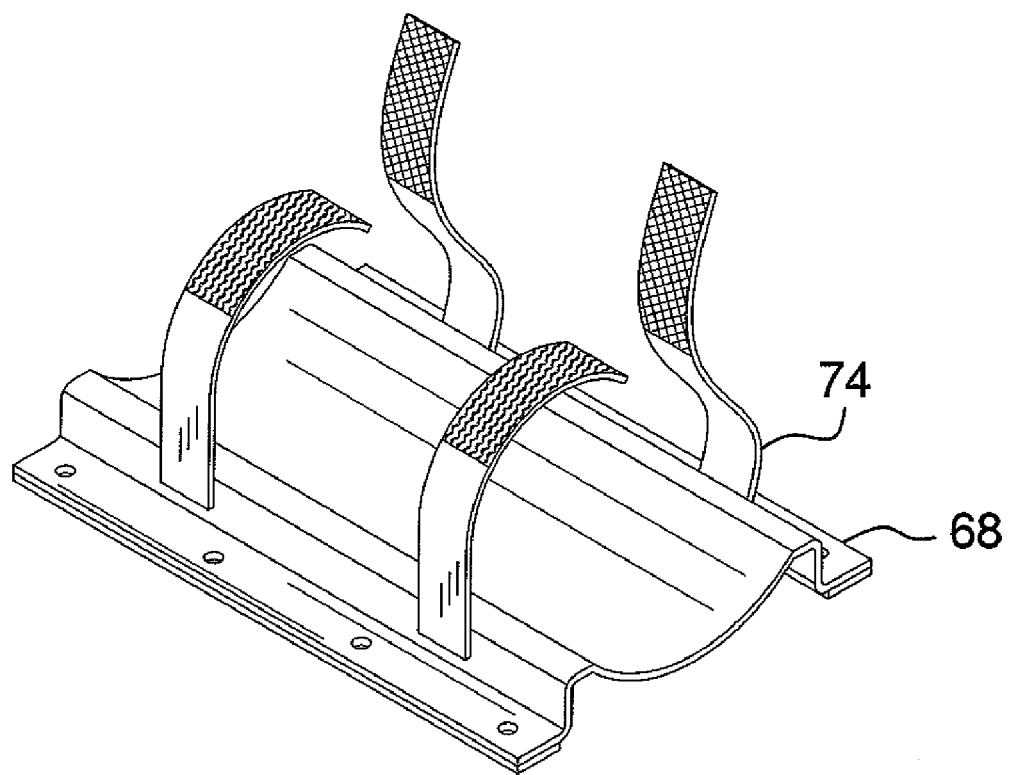
FIG. 7 is a top perspective view of a mount of an embodiment of the disclosure.

The squeegee assembly 22 also includes an elongated panel 40 that has first edge 42 and a second edge 44 positioned opposite to each other. The first edge 42 comprises an elongated blade extending along a length of the panel 40 and is comprised of a resiliently flexible material such as an elastomer. A coupler 46 releasably couples the panel 40 to the second end 28 of the handle 24 to orientate a longitudinal axis of the blade, or first edge 42, perpendicular to a longitudinal axis of the handle 24 and orientate a plane of the second edge 44 parallel to the longitudinal axis. The coupler 46 includes a pair of legs 48 each being attached to a lateral side 50 of the panel 40 adjacent to the first edge 42 and also being attached to each other at a joined area 52. A tether 54 is attached to the joined area 52 and extends through the handle 12 and is engaged to an actuator 56 mounted on the handle 24. The tether 54 pulls the joined area 52 into the second end 28 when the actuator 56 is moved away from the second end 28 of the handle 24. The actuator 56 includes a locking pin 58 slidably extended along an elongated notch 60 and lockable in place on a curve 62 in the notch 60 as shown in FIG. 2. The legs 48 are positioned in a slot 64 extending into the second end 28 when the joined area 52 is pulled into the second end 54 to prevent rotation of the panel 40 with respect to the handle 24. An absorbent member 66 is attached to the second edge 44 of the panel 40. The absorbent member 66 is removable from the panel 40 and may be comprised of a sponge material.

A mounting plate 68 is removably mounted in a vehicle 70 and more in particular may be positioned within a trunk 72 of the vehicle 70. A securing member 74 is attached to the mounting plate 68 and releasably secures the housing 12 to the mounting plate 68. The securing member 74 may comprise one or more straps using hook and loop connectors to retain the housing 12 on the mounting plate 68. Alternatively, the housing 14 may includes its own legs 76 for stabilizing the housing 12.

In use, conventional cleaning fluid used for cleaning windows is positionable within the housing 12 and accessible by the squeegee assembly 22. When the windows of a vehicle are not clean, the user of the system 10 removes the cap 30 and the squeegee assembly 22 from the housing 12 to expose the blade 42 and the absorbent member 66. The actuator 56 pulls the panel 40 into a deployed position so that the blade 42 and absorbent member 66 can be used. The absorbent member 66 absorbs fluid from the housing 12 to be applied to the windows in a cleaning motion and the blade 42 is then used to remove the cleaning fluid and vision obstructing material from the window in a conventional manner. When finished, the actuator 56 is moved toward the second end 28 to release the panel 40 from the second end 28 to form a more compact squeegee assembly 22 more easily positionable in the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A vehicle window cleaning system comprising:
   a housing having an end wall and a perimeter wall being attached to and extending away from said end wall, said perimeter wall having a distal edge with respect to said end wall defining an opening extending into said housing;
   a squeegee assembly being removably positionable within said housing, said squeegee assembly including;
     an elongated handle having a first end and a second end;
     a cap having a first side, a second side and a perimeter edge extending between said first and second sides, said handle extending through said first and second sides and said cap being attached to said handle between said first and second ends, said perimeter edge being engageable with said peripheral wall to close said opening while said second end is positioned within said housing;
     an elongated panel having a first edge and a second edge positioned opposite to each other, said first edge comprising an elongated blade extending along a length of said panel and being comprised of a resiliently flexible material;
     a coupler releasably coupling said panel to said second end of said handle to orientate a longitudinal axis of said blade perpendicular to a longitudinal axis of said handle, said coupler including a pair of legs each being attached to a lateral side of said panel adjacent to said first edge and being attached to each other at a joined area forming a V-shaped support structure for said panel, a tether being attached to said joined area and extending through said handle and engaged to an actuator mounted on said first end of said handle, said tether pulling said joined area into said second end when said actuator is moved away from said second end of said handle, said legs being positioned in a slot extending into said second end when said joined area is pulled into said second end to prevent rotation of said panel with respect to said handle; and
   wherein cleaning fluid is positionable within said housing and accessible by said squeegee assembly.

2. The system according to claim 1, wherein said perimeter wall is translucent to allow viewing of material within said housing.

3. The system according to claim 1, further including an absorbent member being attached to said second edge of said panel, said absorbent member being removable from said panel.

4. The system according to claim 1, further including:
   a mounting plate being removably mounted in a vehicle;
   a securing member being attached to said mounting plate and releasably securing said housing to said mounting plate.

5. A vehicle window cleaning system comprising:
   a housing having an end wall and a perimeter wall being attached to and extending away from said end wall, said perimeter wall having a distal edge with respect to said end wall defining an opening extending into said housing, said perimeter wall being translucent to allow viewing of material within said housing;
   a squeegee assembly being removably positionable within said housing, said squeegee assembly including;
     an elongated handle having a first end and a second end;
     a cap having a first side, a second side and a perimeter edge extending between said first and second sides, said handle extending through said first and second sides and said cap being attached to said handle between said first and second ends, said perimeter edge being engageable with said peripheral wall to close said opening while said second end is positioned within said housing;
     an elongated panel having a first edge and a second edge positioned opposite to each other, said first edge comprising an elongated blade extending along a length of said panel and being comprised of a resiliently flexible material;
     a coupler releasably coupling said panel to said second end of said handle to orientate a longitudinal axis of said blade perpendicular to a longitudinal axis of said handle, said coupler including a pair of legs each being attached to a lateral side of said panel adjacent to said first edge and being attached to each other at a joined area forming a V-shaped support structure for said panel, a tether being attached to said joined area and extending through said handle and engaged to an actuator mounted on said first end of said handle, said tether pulling said joined area into said second end when said actuator is moved away from said second end of said handle, said legs being positioned in a slot extending into said second end when said joined area is pulled into said second end to prevent rotation of said panel with respect to said handle;
     an absorbent member being attached to said second edge of said panel, said absorbent member being removable from said panel;
   a mounting plate being removably mounted in a vehicle;
   a securing member being attached to said mounting plate and releasably securing said housing to said mounting plate; and
   wherein cleaning fluid is positionable within said housing and accessible by said squeegee assembly.

\* \* \* \* \*